US007792831B2

(12) United States Patent
Cho et al.

(10) Patent No.: US 7,792,831 B2
(45) Date of Patent: Sep. 7, 2010

(54) APPARATUS, SYSTEM AND METHOD FOR EXTRACTING STRUCTURE OF SONG LYRICS USING REPEATED PATTERN THEREOF

(75) Inventors: Sung-jung Cho, Yongin-si (KR); Chang-kyu Choi, Seongnam-si (KR); Hye-jeong Lee, Seoul (KR); Yeun-bae Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 205 days.

(21) Appl. No.: 11/651,040

(22) Filed: Jan. 9, 2007

(65) Prior Publication Data

US 2007/0186754 A1 Aug. 16, 2007

(30) Foreign Application Priority Data

Feb. 10, 2006 (KR) ..................... 10-2006-0013269

(51) Int. Cl.
*G06F 17/30* (2006.01)

(52) U.S. Cl. ........................ 707/729; 707/755; 707/916

(58) Field of Classification Search ................. 707/101, 707/729, 755, 916, 999.101
See application file for complete search history.

(56) References Cited

U.S. PATENT DOCUMENTS

| | | | | |
|---|---|---|---|---|
| 5,319,779 | A * | 6/1994 | Chang et al. | 707/3 |
| 5,854,619 | A | 12/1998 | Kato | |
| 5,986,200 | A | 11/1999 | Curtin | |
| 6,307,139 | B1 * | 10/2001 | Iwamura | 84/601 |
| 2002/0021311 | A1 * | 2/2002 | Shechter et al. | 345/864 |
| 2002/0038597 | A1 * | 4/2002 | Huopaniemi et al. | 84/609 |
| 2003/0233929 | A1 * | 12/2003 | Agnihotri | 84/609 |
| 2005/0123886 | A1 | 6/2005 | Hua et al. | |
| 2008/0005688 | A1 * | 1/2008 | Najdenovski | 715/765 |

FOREIGN PATENT DOCUMENTS

| | | | |
|---|---|---|---|
| CN | 1343348 | A | 4/2002 |
| DE | 10053720 | A1 | 4/2002 |
| EP | 1172796 | A1 | 1/2002 |
| JP | 2002-074911 | A | 3/2002 |
| KR | 10-2000-0036714 | A | 7/2000 |

(Continued)

OTHER PUBLICATIONS

Bengtsson—Find song by lyrics, Jun. 1, 2004 (accessed Apr. 15, 2010 at http://www.peterbe.com/Find-song-by-lyrics).*

(Continued)

*Primary Examiner*—James Trujillo
*Assistant Examiner*—William Spieler
(74) *Attorney, Agent, or Firm*—Sughrue Mion, PLLC

(57) ABSTRACT

An apparatus, system, and method for extracting the structure of song lyrics using a repeated pattern thereof are provided. The apparatus includes a lyric extractor extracting lyric information from metadata related to an audio file, a character string information extractor extracting an interlude section and a repeated character string based on the extracted lyric information, a paragraph extractor extracting a paragraph based on the repeated character string and then a set of paragraphs having the same repeated pattern among the extracted paragraphs, and a lyric structure generator arranging an interlude section, a character string, and a paragraph related to the audio file in a tree structure.

16 Claims, 15 Drawing Sheets

FOREIGN PATENT DOCUMENTS

| | | |
|---|---|---|
| KR | 10-2005-0102696 A | 10/2005 |
| KR | 10-2005-0106246 A | 11/2005 |

OTHER PUBLICATIONS

O'Neill—What is Lyrics3 v2.00?, Dec. 17, 2006 (accessed Apr. 15, 2010 at http://www.id3.org/Lyrics3v2).*

Mahedero et al., Natural Language Processing of Lyrics, Nov. 11, 2005.*

Zhu et al., Multimodal Content-based Structure Analysis of Karaoke Music, Nov. 11, 2005.*

Mallett D. et al: "Information-Content Based Sentence Extraction for Text Summarization;" Information Technology: Coding and Computing, 2004. Proceedings. ITCC 2004. International conference on Las Vegas, NV, USA Apr. 5-7, 2004, Piscataway, NJ, USA, IEEE, vol. 2, Apr. 5, 2004, pp. 214-218, XP010697084 ISBN: 0-7695-2108-8.

Communication from the State Intellectual Property Office of P.R. China dated Apr. 15, 2010, in counterpart Chinese Application No. 200710007066.3.

* cited by examiner

FIG. 2A

21

| | | |
|---|---|---|
| 1st CHARACTER STRING | 000014580 | Every morning I see the same directions in the compass of life |
| 2nd CHARACTER STRING | 000018380 | I kneel myself to the simple world so easily and complain and complain to myself |
| 3rd CHARACTER STRING | 000027000 | Blame myself over and over, Alas, Alas, looking for the old dream, so far away |
| 4th CHARACTER STRING | 000030060 | Make two arms open to the sky like wings, you can fly |
| 5th CHARACTER STRING | 000033120 | You can fly higher |
| 6th CHARACTER STRING | 000039280 | Than the birds in the sky |
| 7th CHARACTER STRING | 000045440 | You can fly higher |
| 8th CHARACTER STRING | 000050940 | The only you and I in the world |
| 9th CHARACTER STRING | 000057860 | Fly (My baby) Whatever the world says |
| 10th CHARACTER STRING | 000063340 | (Fly, fly, get em up high, whoever says, go go) |

FIG. 2B

| | | |
|---|---|---|
| 1st CHARACTER STRING | 000014560 | everymorningiseethesamedirections inthecompassoflife |
| 2nd CHARACTER STRING | 000018380 | ikneelmyselftothesimpleworldsoeasily andcomplainandcomplaintomyself |
| 3rd CHARACTER STRING | 000027000 | blamemyselfoverandover, alasalaslookingfortheolddreamsofaraway |
| 4th CHARACTER STRING | 000030060 | maketwoarmsopentothesky likewingsyoucanfly |
| 5th CHARACTER STRING | 000033120 | youcanflyhigher |
| 6th CHARACTER STRING | 000039280 | thanthebirdsinthesky |
| 7th CHARACTER STRING | 000045440 | youcanflyhigher |
| 8th CHARACTER STRING | 000050940 | theonlyyouandiintheworld |
| 9th CHARACTER STRING | 000057860 | flywhatevertheworldsays |

FIG. 2C

| | | |
|---|---|---|
| 1st CHARACTER STRING | 000014560 | everymorningiseethesamedirections inthecompassoflife |
| 2nd CHARACTER STRING | 000018380 | ikneelmyselftothesimpleworldsoeasily andcomplainandcomplaintomyself |
| 5th CHARACTER STRING | 000033120 | youcanflyhigher |
| 6th CHARACTER STRING | 000039280 | thanthebirdsinthesky |
| 7th CHARACTER STRING | 000045440 | youcanflyhigher |
| 8th CHARACTER STRING | 000050940 | theonlyyouandintheworld |
| 9th CHARACTER STRING | 000057860 | flywhatevertheworldsays |

FIG. 3

As if nothing happened
I walked around streets
Could I happen to see you agin
I hold myself so desperately
I would like to cry
Makes my dark mind so bright,
the only name
I couldn't stand any more
too desperate days
From now one, we
become so distant like strangers in streets
I'll live like that
Those who
do not have any relationship
There will be no more sad broke-up between them

INTERLUDE

Makes my dark mind so bright,
the only name
I couldn't stand any more
too desperate days
From now one, we
become so distant like strangers in streets
I'll live like that
Those who
do not have any relationship
There will be no more sad broke-up between them

INTERLUDE

From now one, we
become so distant like strangers in streets
I'll live like that
Those who
do not have any relationship
There will be no more sad broke-up between them

→

As if nothing happened
I walked around streets
Could I happen to see you agin
I hold myself so desperately
I would like to cry
Makes my dark mind so bright,
the only name
I couldn't stand any more
too desperate days
From now one, we
become so distant like strangers in streets
I'll live like that
Those who
do not have any relationship
There will be no more sad broke-up
between them

INTERLUDE

Makes my dark mind so bright
the only name
I couldn't stand any more
too desperate days
From now one, we
become so distant like strangers in streets
I'll live like that
Those who
do not have any relationship
There will be no more sad broke-up
between them

INTERLUDE

From now one, we
become so distant like strangers in streets
I'll live like that
Those who
do not have any relationship
There will be no more sad broke-up
between them

FIG. 4B

| NUMBER OF REPETITIONS | LYRIC SENTENCE |
|---|---|
| 1 | as if nothing happened |
| 1 | li walked around streets |
| 1 | could i happen to see you agin |
| 1 | i hold myself so desperately |
| 1 | i would like to cry |
| 2 | makes my dark mind so bright |
| 2 | the only name |
| 2 | i couldn't stand any more |
| 2 | too desperate days |
| 3 | from now one, we |
| 3 | become so distant like strangers in streets |
| 3 | i'll live like that |
| 3 | those who |
| 3 | do not have any relationship |
| 3 | there will be no more sad broke-up between them |
| | interlude |
| 2 | makes my dark mind so bright |
| 2 | the only name |
| 2 | i couldn't stand any more |
| 2 | too desperate days |
| 3 | from now one, we |
| 3 | become so distant like strangers in streets |
| 3 | i'll live like that |
| 3 | those who |
| 3 | do not have any relationship |
| 3 | there will be no more sad broke-up between them |
| | interlude |
| 3 | from now one, we |
| 3 | become so distant like strangers in streets |
| 3 | i'll live like that |
| 3 | those who |
| 3 | do not have any relationship |
| 3 | there will be no more sad broke-up between them |

FIG. 5D

| PARAGRAPH ID | NUMBER OF REPETITIONS | LYRIC CHARACTER STRING | |
|---|---|---|---|
| ° | 1 | so clean feeling, you showed me | |
| ° | 1 | like the fresh morning sunshine | |
| ° | 1 | your unique bright scent | |
| ° | 1 | comes into my mind | |
| 0 | 11 | goodlady | P0 |
| 1 | 6 | you with so small and white hands | P1 |
| | | makes me crazy | |
| 0 | 11 | goodlady | P0 |
| 2 | 5 | with lovely eyes, could you | P2 |
| | | smile at me | |
| | | interlude | |
| ° | 1 | your cute small lips | |
| ° | 1 | so bright and warm smile | |
| ° | 1 | could we stay over the night | |
| ° | 1 | i can't dare to ask her about it | |
| 0 | 11 | goodlady | P0 |
| 1 | 6 | you with so small and white hands | P1 |
| | | makes me crazy | |
| 0 | 11 | goodlady | P0 |
| 2 | 5 | with lovely eyes, could you | P2 |
| | | smile at me | |
| 0 | 11 | goodlady | P0 |
| 1 | 6 | you with so small and white hands | P1 |
| | | makes me crazy | |
| 0 | 11 | goodlady | P0 |
| 2 | 5 | with lovely eyes, could you | P2 |
| | | smile at me | |
| | | interlude | |
| ° | 1 | what happened today | |
| ° | 1 | i can't see you | |
| ° | 1 | i feel nervous in my heart | |
| ° | 1 | how could I come down my trembling hands | |
| | | interlude | |
| 0 | 11 | goodlady | P0 |
| 1 | 6 | you with so small and white hands | P1 |
| | | makes me crazy | |
| 0 | 11 | goodlady | P0 |
| 2 | 5 | with lovely eyes, could you | P2 |
| | | smile at me | |
| 0 | 11 | goodlady | P0 |
| 1 | 6 | you with so small and white hands | P1 |
| | | makes me crazy | |
| 0 | 11 | goodlady | P0 |
| 2 | 5 | with lovely eyes, could you | P2 |
| | | smile at me | |
| 0 | 11 | goodlady | P0 |
| 1 | 6 | you with so small and white hands | P1 |
| | | makes me crazy | |

FIG. 6

| PARAGRAPH ID | NUMBER OF REPETITIONS | LYRIC CHARACTER STRING |
|---|---|---|
| • | 1 | so clean feeling, you showed me |
| • | 1 | like the fresh morning sunshine |
| • | 1 | your unique bright scent |
| • | 1 | comes into my mind |
| 0 | 11 | goodlady |
| 1 | 6 | you with so small and white hands |
| | | makes me crazy |
| 0 | 11 | goodlady |
| 2 | 5 | with lovely eyes, could you |
| | | smile at me |
| | | interlude |
| • | 1 | your cute small lips |
| • | 1 | so bright and warm smile |
| • | 1 | could we stay over the night |
| • | 1 | i can't dare to ask her about it |
| 0 | 11 | goodlady |
| 1 | 6 | you with so small and white hands |
| | | makes me crazy |
| 0 | 11 | goodlady |
| 2 | 5 | with lovely eyes, could you |
| | | smile at me |
| 0 | 11 | goodlady |
| 1 | 6 | you with so small and white hands |
| | | makes me crazy |
| 0 | 11 | goodlady |
| 2 | 5 | with lovely eyes, could you |
| | | smile at me |
| | | interlude |
| • | 1 | what happened today |
| • | 1 | i can't see you |
| • | 1 | i feel nervous in my heart |
| • | 1 | how could I come down my trembling hands |
| | | interlude |
| 0 | 11 | goodlady |
| 1 | 6 | you with so small and white hands |
| | | makes me crazy |
| 0 | 11 | goodlady |
| 2 | 5 | with lovely eyes, could you |
| | | smile at me |
| 0 | 11 | goodlady |
| 1 | 6 | you with so small and white hands |
| | | makes me crazy |
| 0 | 11 | goodlady |
| 2 | 5 | with lovely eyes, could you |
| | | smile at me |
| 0 | 11 | goodlady |
| 1 | 6 | you with so small and white hands |
| | | makes me crazy |

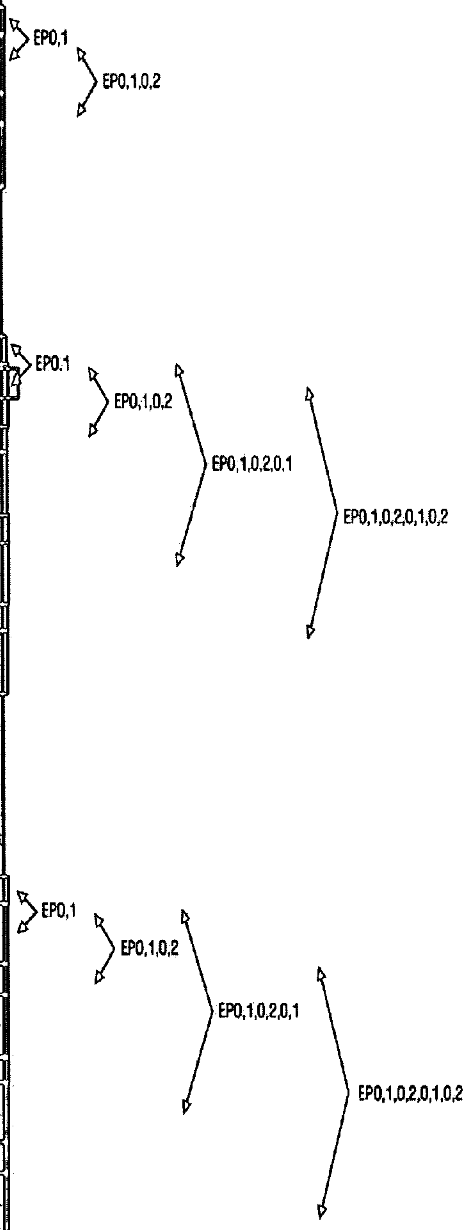

APPARATUS, SYSTEM AND METHOD FOR EXTRACTING STRUCTURE OF SONG LYRICS USING REPEATED PATTERN THEREOF

CROSS-REFERENCE TO RELATED APPLICATION

This application claims priority from Korean Patent Application No. 10-2006-0013269 filed on Feb. 10, 2006 in the Korean Intellectual Property Office, the disclosure of which is incorporated herein by reference in its entirety.

BACKGROUND OF THE INVENTION

1. Field of the Invention

The present invention relates to an apparatus, system, and method for extracting the structure of song lyrics based on a repeated pattern of song lyrics, and more particularly, to an apparatus, system, and method for extracting the structure of song lyrics based on a repeated pattern of song lyrics, which can arrange lyric information in a tree structure by extracting repeated character string and paragraph through analysis of the song lyrics.

2. Description of the Related Art

Recently, portable audio file players that can reproduce digitally encoded audio files have been commonly used. That is, compact hand-held devices that can process digitally encoded audio files stored in semiconductor memories have become popular.

Further, as the demands for portable audio file players offering higher data storage capacities have increased, next-generation players containing compact, high capacity hard drives have been developed and are rapidly gaining popularity.

In an audio file player, data in a digital audio file is loaded into a data storage device by first downloading the data from an audio CD, Internet, or another digital audio device to a PC. Then, the data is usually compressed according to a selected encoding format and loaded into the data storage device for the audio file player.

The audio file is decompressed/decoded by the audio file player during playback according to the selected encoding format. Various encoding formats for compressing and decompressing audio files are available. Examples of encoding formats include, but are not limited to, MP3 and MP3 Pro.

For MP3 encoded audio files, a special set of frames called an ID3 tag are prefixed or appended to a data file. ID3 tags contain descriptive text and other data related to the audio file. For example, an ID3 tag may include title, artist, album, year, genre, and comments. ID3 tag information is useful for searching, sorting, and selecting a specific audio file based on the information contained in the ID3 tag. Because ID3 tag information is often stored as textual characters, the information can be displayed on the display screen of the audio file player.

With the advancement of technology, various independent devices are being integrated into single systems and the size of such devices is decreasing. In the wake of this trend, an audio file player is being miniaturized and the size of a display window is decreasing. Thus, selecting a song title by manipulating small densely arranged buttons on the display window may cause considerable inconvenience to users.

Further, due to the increasing numbers of audio files being stored in audio file players, it is taking longer for users to retrieve desired audio files.

One approach to efficiently search for a desired audio file is to use speech recognition for beginning index characters and a complete list of artist names and song titles. Another method is to use a music melody such as humming. Another method includes creating a fingerprint representing the characteristics of an audio file and providing an audio file having similar characteristics (singer/album/melody) to those of a song being currently played.

The above-described conventional approaches to providing audio files allow users to perform searches depending on the classification and characteristics of audio files owned by them. The conventional approaches also require users to remember complete information about the desired file. Another drawback is that it requires a lot of time for a user to recognize an audio file being played because the audio file has to be played from the beginning portion (i.e., prelude portion) of the file for confirmation.

The Japanese Laid-open Patent Application 2002-074911 proposes an audio player that can retrieve a specific item in ID3 tag data containing features of each song such as prelude, lyrics and repeated section, which were previously recorded while audio data is being written to a recording medium such as CD in the form of MP3, and create a list of information to be retrieved containing the features. However, the audio player does not provide a technique for creating a tree structure using information from an audio file and providing a specific service section using information about the tree structure upon a user's request for a service.

SUMMARY OF THE INVENTION

Illustrative, non-limiting exemplary embodiments of the present invention overcome the above disadvantages, and other disadvantages not described above.

An apparatus, system, and method consistent with the present invention extracts the structure of song lyrics using a repeated pattern thereof that can create a tree structure using information about the song lyrics by extracting repeated character string and paragraph through analysis of the lyric information.

The present invention also provides an apparatus, system, and method for extracting the structure of song lyrics using a repeated pattern thereof that can reduce the amount of time required to select an audio file by extracting a thematic portion of the audio file based on the extracted structure of song lyrics.

The above stated objects as well as other objects, features and advantages, of the present invention will become clear to those skilled in the art upon review of the following description.

According to an aspect of the present invention, there is provided an apparatus for extracting the structure of song lyrics using a repeated pattern of the song lyrics, including: a lyric extractor extracting lyric information from metadata related to an audio file; a character string information extractor extracting an interlude section and a repeated character string based on the extracted lyric information; a paragraph extractor extracting a paragraph based on the repeated character string and then a set of paragraphs having the same repeated pattern among the extracted paragraphs; and a lyric structure generator arranging interlude sections, character strings, and paragraphs related to the audio file in a tree structure.

According to another aspect of the present invention, there is provided a method for extracting the structure of song lyrics using a repeated pattern of the song lyrics, the method including extracting lyric information from metadata related to an audio file, extracting an interlude section and a repeated character string based on the extracted lyric information, extracting a paragraph based on the repeated character string, extracting a set of paragraphs having the same repeated pattern among the extracted paragraphs, and arranging interlude sections, character strings, and paragraphs related to the audio file in a tree structure.

BRIEF DESCRIPTION OF THE DRAWINGS

The above and/or other features and advantages of the present invention will become more apparent by describing in detail preferred exemplary embodiments thereof with reference to the attached drawings in which:

FIGS. 2A-2C illustrate an example of preprocessing extracted lyric information using a repeated pattern through a preprocessor in an apparatus for extracting the structure of song lyrics using a repeated pattern thereof according to a modified exemplary embodiment of the present invention;

FIG. 3 illustrates an example of extracting a keyword for an interlude section from lyric information in an interlude section extractor of an apparatus for extracting the structure of song lyrics using a repeated pattern thereof according to a modified exemplary embodiment of the present invention;

FIGS. 4A-4D illustrate an example of calculating a distance between two character strings and extracting a repeated character string in a character string repetition number extractor of an apparatus for extracting the structure of song lyrics using a repeated pattern thereof according to a modified exemplary embodiment of the present invention;

FIGS. 5A-5D illustrate an example of extracting a paragraph in a first paragraph extractor of an apparatus for extracting the structure of song lyrics using a repeated pattern thereof according to a modified exemplary embodiment of the present invention;

FIG. 6 illustrates an example of extracting an extended paragraph (EP) in a second paragraph extractor of an apparatus for extracting the structure of song lyrics using a repeated pattern thereof according to a modified exemplary embodiment of the present invention;

DETAILED DESCRIPTION OF THE INVENTION

Figure 1:
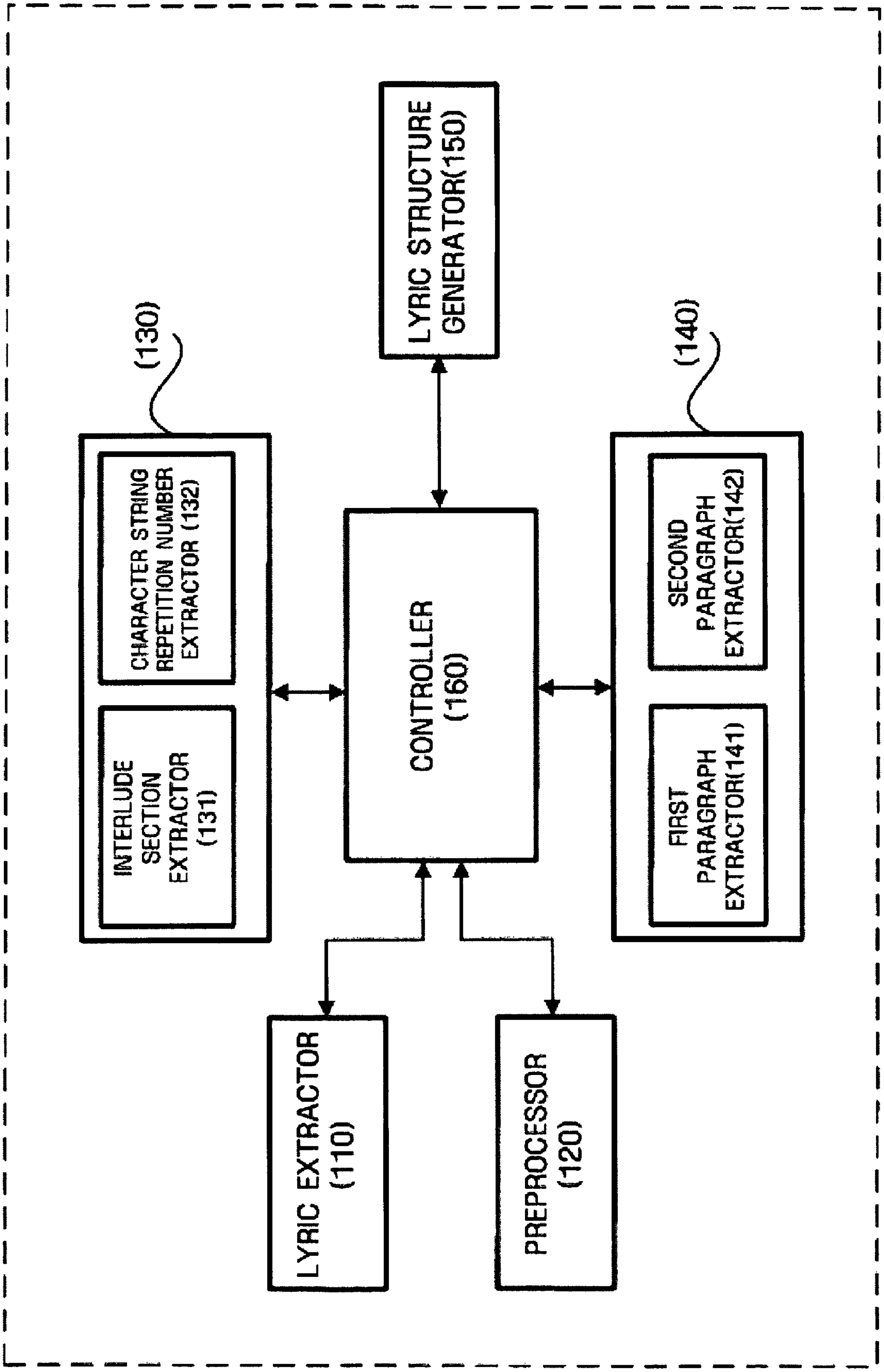
FIG. 1 is an internal block diagram of an apparatus for extracting the structure of song lyrics using a repeated pattern thereof according to an exemplary embodiment of the present invention.

Advantages and features of the present invention and methods of accomplishing the same may be understood more readily by reference to the following detailed description of preferred exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

The present invention will now be described more fully with reference to the accompanying drawings, in which preferred exemplary embodiments of the invention are shown.

FIG. 1 is an internal block diagram of an apparatus for extracting the structure of song lyrics using a repeated pattern thereof according to an exemplary embodiment of the present invention. For example, the apparatus for extracting the structure of song lyrics using a repeated pattern thereof is a portable device that can play back predetermined audio data. The portable device may be a mobile phone, a personal digital assistant (PDA), or an MPEG Audio Layer-3 (MP3) player.

Referring to FIG. 1, the apparatus for extracting the structure of song lyrics using a repeated pattern thereof includes a lyric extractor 110, a preprocessor 120, a character string information extractor 130, a paragraph extractor 140, a lyric structure generator 150, and a controller 160.

Here, the term 'unit', 'module', or 'component', as used herein, means, but is not limited to, a software or hardware component, such as a Field Programmable Gate Array (FPGA) or Application Specific Integrated Circuit (ASIC), which performs certain tasks. A unit may advantageously be configured to reside on the addressable storage medium and configured to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a communication system.

The lyric extractor 110 extracts lyric information from metadata related to an audio file. For example, the metadata may be stored in the form of a version 2 ID3 (ID3v2) tag or a watermark.

The preprocessor 120 deletes supplementary information contained in the lyric information extracted by the lyric extractor 110. The supplementary information is all information other than the lyric information, including special characters (e.g., -, _, ( ), < >, and . . . ), punctuation marks (e.g., ' and "), and blank spaces (e.g., spaces between words).

The preprocessor 120 also converts upper-case characters into lower-case characters and checks whether a string containing a rap portion exists in the lyric information and separates the found string from the lyric information. In this case, the preprocessor 120 determines the presence of a rap portion using timing information provided together with the lyric information and the number of characters contained in the character string. An example of preprocessing the lyric information will be described in more detail later with reference to FIG. 2.

The character string information extractor 130 extracts an interlude section and a repeated character string based on the lyric information preprocessed by the preprocessor 120. Because the lyric information is provided on a character string basis, the character string information extractor 130 extracts an interlude section and a repeated character string from the respective character strings. The character string information extractor 130 includes an interlude section extractor 131 and a character string repetition number extractor 132.

The interlude section extractor 131 extracts a word that is the same as a keyword for an interlude section from a character string within the lyric information. The keyword can be understood as 'interlude being played' and 'interlude'. An example of extracting a keyword for an interlude section from lyric information will be described in more detail later with reference to FIG. 3.

The character string repetition number extractor 132 calculates a distance between two character strings and extracts a repeated character string. The distance between two character strings is obtained by comparing the degree of sameness between characters within the two character strings or the degree of repetition of the same characters (i.e., similarity) within the character strings. When the degree of sameness or similarity is greater than a threshold (e.g., 70%), the two character strings can be determined to be the same. The character string repetition number extractor 132 uses the Equations (1) and (2) below to calculate the distance between the character strings.

The Equation (1) is used to obtain the distance $sim(S_I, S_J)$ between character string $S_I$ with a number I of characters and character string $S_J$ with a number J of characters.

$$sim(S_I,S_J)=A_{I,J}/\max(I,J) \quad (1)$$

where $A_{I,J}$ denotes the number of the same characters within each character string and max(I,J) denotes a greater number of characters within one of the character strings $S_I$ and $S_J$ than the number of characters within the other character string. When the distance between the two character strings $S_I$ and $S_J$ is less than 70%, the two character strings $S_I$ and $S_J$ are not determined to be similar (or the same) to each other. The threshold of 70% may be adjusted depending on some factors such as typing errors contained in the lyric information.

The similarity a(i,j) between characters within each character string is defined by the Equation (2):

$$a(i,j)=\max(a(i,j-1),a(i-1,j),a(i-1,j-1)+\delta(s_i,s_j)) \quad (2)$$

where $\delta(s_i,s_j)$ indicates the sameness between characters being compared. When the characters are the same, $\delta(s_i, s_j)$ has a value of '1'. When the characters are not the same, $\delta(s_i, s_j)$ has a value of '0'. Thus, the distance between two character strings can be calculated by using the Equations (1) and (2) and a repeated character string can be extracted based on the calculated distance. An example of calculating a distance between two character strings and extracting a repeated character string will be more fully described later with reference to FIG. 4.

The paragraph extractor 140 extracts a paragraph using a repeated character string extracted by the character string information extractor 130 and then a set of consecutive paragraphs having the same repeated pattern from the extracted paragraphs. A paragraph is a set of consecutive character strings having the same number of repetitions. A set of paragraphs having the same repeated pattern is hereinafter called an 'extended paragraph (EP)'. The paragraph extractor 140 includes first and second paragraph extractors 141 and 142.

The first paragraph extractor 141 extracts a paragraph using a repeated character string extracted by the character string information extractor 130. In this case, the paragraph is extracted using a dynamic programming search algorithm.

For example, when the lyric information contains 12 character strings A, B, C, D, E, C, D, E, A, B, C, and D, the character string information extractor 130 determines the number of repetitions of each of the character strings A, B, C, D, and E as 1, 2, 3, 3, and 2, respectively.

The first paragraph extractor 141 extracts a set of consecutive character strings having the same number of repetition among the repeated character strings as a paragraph.

For example, because the set of consecutive character strings C and D are repeated three times and individual character strings C and D are repeated three times, the set of character strings C and D are extracted as a paragraph. On the other hand, because a set of consecutive character strings B and C are repeated twice but the individual character strings B and C are repeated twice and three times, respectively, the set of consecutive character strings B and C are not extracted as a paragraph. An example of extracting a paragraph will be described in more detail later with reference to FIG. 5.

The second paragraph extractor 142 extracts a set of paragraphs having the same repeated pattern ('EP') among paragraphs extracted by the first paragraph extractor 141. An EP is a set of two or more consecutive paragraphs. An example of extracting an EP will be described in more detail later with reference to FIG. 6.

The lyric structure generator 150 arranges analyzed information about song lyrics in a tree structure. In this case, the analyzed information includes information about verses (e.g., first, second, and third verses), title, character string, paragraph, and EP within song lyrics. An example of arranging song lyrics in a tree structure will be described in more detail later with reference to FIG. 7.

The controller 160 provides services requested by a user based on a tree structure created by the lyric structure generator 150.

For example, the controller 160 outputs a thematic portion of an audio file after extracting the thematic portion during a user's retrieval of the audio file or outputs a section appropriate for timing information set upon a user's request for a summary version of audio file. The thematic portion of the audio file refers to the most memorable and impressive portion of a song to a user, a portion of a song containing a theme that a composer desires to emphasize, or the most emotional portion of a song that can be sung by an artist. An example of extracting a thematic portion of an audio file will be described in more detail later with reference to FIG. 5D.

In addition, the controller 160 controls the operation of all other components (110 through 150) of the apparatus for extracting the structure of song lyrics based on a repeated pattern thereof.

FIGS. 2A and 2B illustrate an example of preprocessing lyric information through the preprocessor 120 in the apparatus for extracting the structure of song lyrics using a repeated pattern thereof.

Referring to FIG. 2A, the lyric information includes a plurality of character strings, each character string containing a plurality of characters. Each character string also contains timing information 21 indicating the beginning thereof.

A ninth character string in the lyric information illustrated in FIG. 2A includes characters "Fly (My Baby) Whatever the world says". Referring to FIG. 2B, after being subjected to preprocessing, the ninth character string contains characters "flywhatevertheworldsays".

Thus, preprocessing is performed to delete blank spaces, special characters and content within the special characters and convert upper-case characters into lower-case characters.

Then, the number of characters being played within time assigned to a third character sting is determined based on the time when the third and fourth character strings begin as illustrated in FIG. 2A.

When the third character string is compared with the fourth character string, the length of time required to play the third character string is almost equal to that required to play the fourth character string. The number of characters in the third character string is greater than that contained in the fourth character string. Thus, the third character string is determined to be a rap portion.

Similarly, when the fourth character string is compared with fifth character string, the length of time required to play the fourth character string is almost equal to that required to play the fifth character string. The number of characters in the fourth character string is greater than that contained in the fifth character string. Thus, the fourth character string is determined to be a rap portion.

Thus, as a result of preprocessing, the rap portions (third and fourth character strings) are separated from the lyric information for separate processing as shown in FIG. 2C.

FIG. 3 illustrates an example of extracting a keyword for an interlude section from lyric information in the interlude section extractor (131 of FIG. 1) of the apparatus for extracting the structure of song lyrics using a repeated pattern thereof according to a modified exemplary embodiment of the present invention.

Referring to FIG. 3, the interlude section extractor 131 checks whether the same word as a keyword 'interlude' exists in the lyric information consisting of a plurality of character strings, on a character string basis.

When the same word as the keyword exists in a character string, the interlude section extractor 131 divides the lyric information into three verses (first through third verses) according to a character string containing the found keyword (e.g., interlude). Information about verses (first through third verses) obtained by splitting the lyric information according to the interlude section will be used to generate the structure of song lyrics.

Figure 4A:
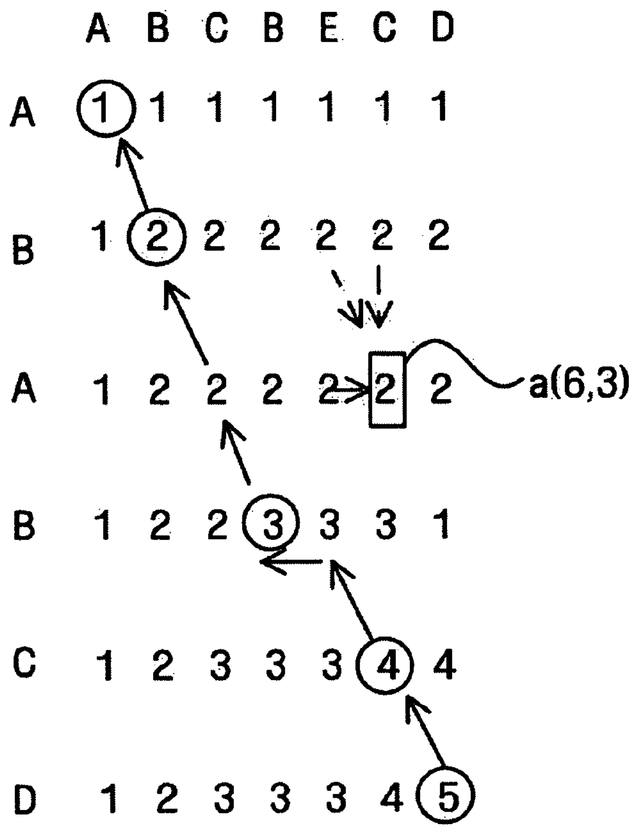

FIGS. 4A and 4B illustrate an example of calculating a distance between two character strings and extracting a repeated character string in the character string repetition number extractor (132 of FIG. 1) of the apparatus for extracting the structure of song lyrics using a repeated pattern thereof according to a modified embodiment of the present invention.

Referring to FIG. 4A, first and second character strings respectively contain characters 'ABCBECD' and 'ABABCD'. The Equation (2) is used to measure the degree of similarity between the first and second character strings.

The degree of similarity a(1,1) between first characters in the first and second character strings is equal to max(a(1,0), a(0,1), a(0,0)+$\delta(S_1, S_1)$). However, because a(1, 0), a(0, 1) and a(0,0) are not defined, they are regarded as '0'. Because the first syllable A in the first character string is the same as the first syllable in the second character string, $\delta(S_1, S_1)$ has a value of 1. Thus, a(1,1) is 1.

Similarly, the degree of similarity a(6,3) between a sixth syllable in the first character string and a third syllable in the second character string is equal to max(a(6,2), a(5,3), a(5,2)+$\delta(S_6, S_3)$). Because a(6,2), a(5,3), and a(5,2) are 2 and $\delta(S_6, S_3)$ has a value of 0, a(6,3) is 1. Thus, a(6,3) is 2.

That is, the degree of similarity between two characters can be calculated based on the sameness between the two characters and each of neighboring characters (e.g., located above, left of and diagonal to the two characters).

The degree of similarity between all characters in the first and second character strings is 5.

The process of searching for the same syllable based on the resulting value of 5 is described as follows. Referring to FIG. 4A, the character string repetition number extractor 132 checks whether any one of values located on the left and upper-diagonal directions of a reference value (e.g., 5) is greater than or equal to 5. If a value greater than or equal to 5 exists, the reference value is changed to that value. Conversely, if a value greater than or equal to 5 does not exist, the reference value is changed to a value located in the upper-diagonal direction of the previous reference value a(7,6).

Because a value greater than or equal to 5 does not exist, the reference value is changed to a value a(6,5) located in the upper-diagonal direction. The character string repetition number extractor 132 then checks whether any one of values located in the left and upper-diagonal directions of the reference value a(6,5) is greater than or equal to 4. As a result, because a value greater than or equal to 4 does not exist, the reference value is changed to a(5,4) located in the upper-diagonal direction of the a(6,5).

Then, since a value equal to the reference value of 3 exists in the left direction of a(5,4), the reference value is changed to a(4, 4).

Similarly, the character string repetition number extractor 132 checks whether any one of values located in the left and upper-diagonal directions of the reference value a(4,4) is greater than or equal to 3. Because a value greater than or equal to 3 does not exist, the reference value is changed to a value a(3,3) located in the upper-diagonal direction of a(4,4).

Then, because a value greater than or equal to 2 exists in the left and diagonal directions, the reference value is changed to a value a(2, 2) located in the diagonal direction of a(3,3).

Next, it is checked whether any one of values located in the left and upper-diagonal directions of the reference value a(2, 2) is greater than or equal to 2. Because a value greater than or equal to 2 does not exist, the reference value is changed to a value a(1, 1) located in the upper-diagonal direction of a(2,2).

The number of the same characters calculated using Equation (2) is 5 and the same characters are A, B, B, C, and D that are located at the positions of the changed reference values. In this case, the number of the same characters $A_{I,J}$ is 5 and max(I,J) is 7 since the number of characters in the first and second character strings are 7 and 6, respectively. Substituting these values into the Equation (1) in order to calculate the distance between the first and second character strings gives $sim(S_1,S_2)=5/7=71\%$. That is, because the distance between the first and second character strings is 71%, the two character strings are determined to be similar.

FIG. 4B is a table illustrating the number of repetitions of each character string in the lyric information based on the distance between two character strings calculated as above.

The character string repetition number extractor 132 creates a table listing the number of repetition of each character string based on the distance between two character strings.

More specifically, when the distance between two character strings is greater than 70%, the character string repetition number extractor 132 determines the two character strings are similar (or the same), checks the number of repetition of the character strings, and stores the checked number of repetitions in a table. In this case, the table containing information about the number of repetitions of each character string is used to extract a paragraph.

Figure 5A:
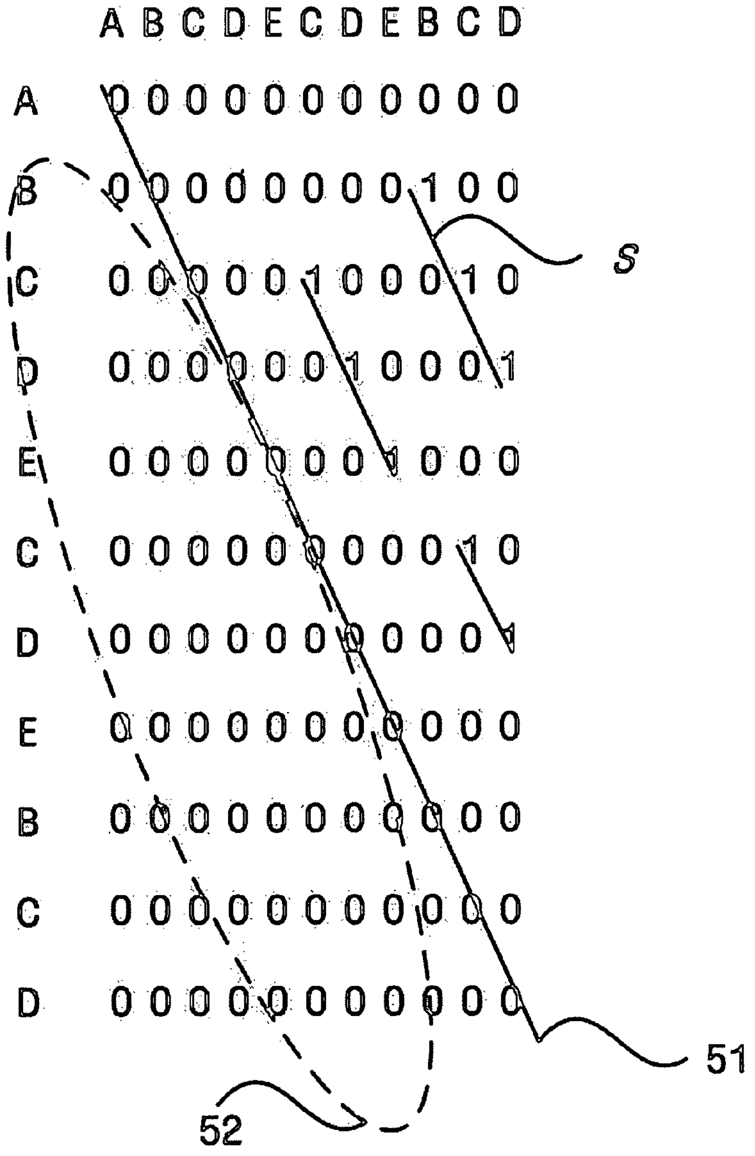
Figure 5B:
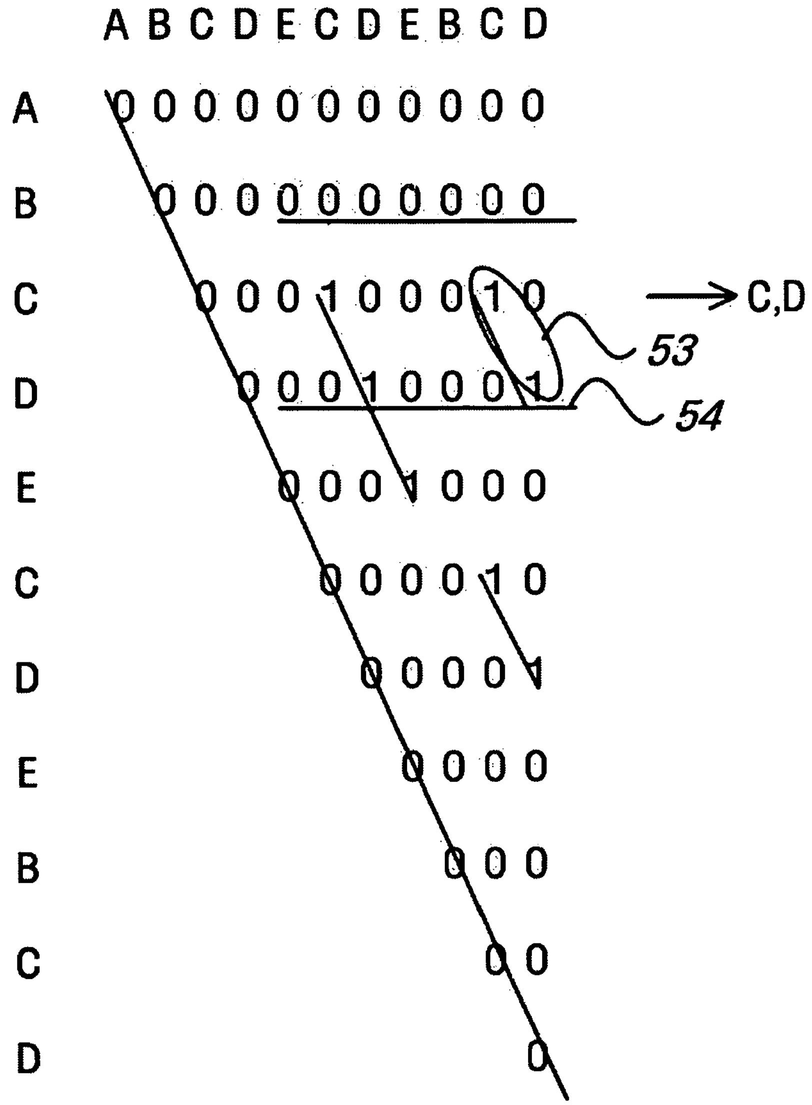

FIGS. 5A and 5B illustrate an example of extracting a paragraph in the first paragraph extractor (141 of FIG. 1) of the apparatus for extracting the structure of song lyrics using a repeated pattern thereof according to a modified embodiment of the present invention.

Referring to FIG. 5A, the same character strings A, B, C, D, E, C, D, E, B, C, and D are arranged along i and j axes. When the i and j axes are divided by a diagonal line 51, an upper part is symmetric to a lower part 52 about the diagonal line 51, and the process of extracting a paragraph is performed on only the upper part.

When the character string information extractor 130 checks whether the same character strings exist by comparing each character string, consecutive character strings having the same value (e.g., 1) in the diagonal direction exist. The consecutive character strings having the same value (e.g., 1) are denoted by 'S'.

The first paragraph extractor 141 checks the presence of a paragraph for character string C occurring on the row as illustrated in FIG. 5B to find that S exists for character strings C, D, and E occurring in a row and character strings C and D occurring in a column. In this case, the first paragraph extractor 141 selects a smaller number of character strings as a paragraph 53 among character strings contained in the S. That is, the character strings C and D occurring in the row and column are selected as the paragraph 53.

Figure 5C:
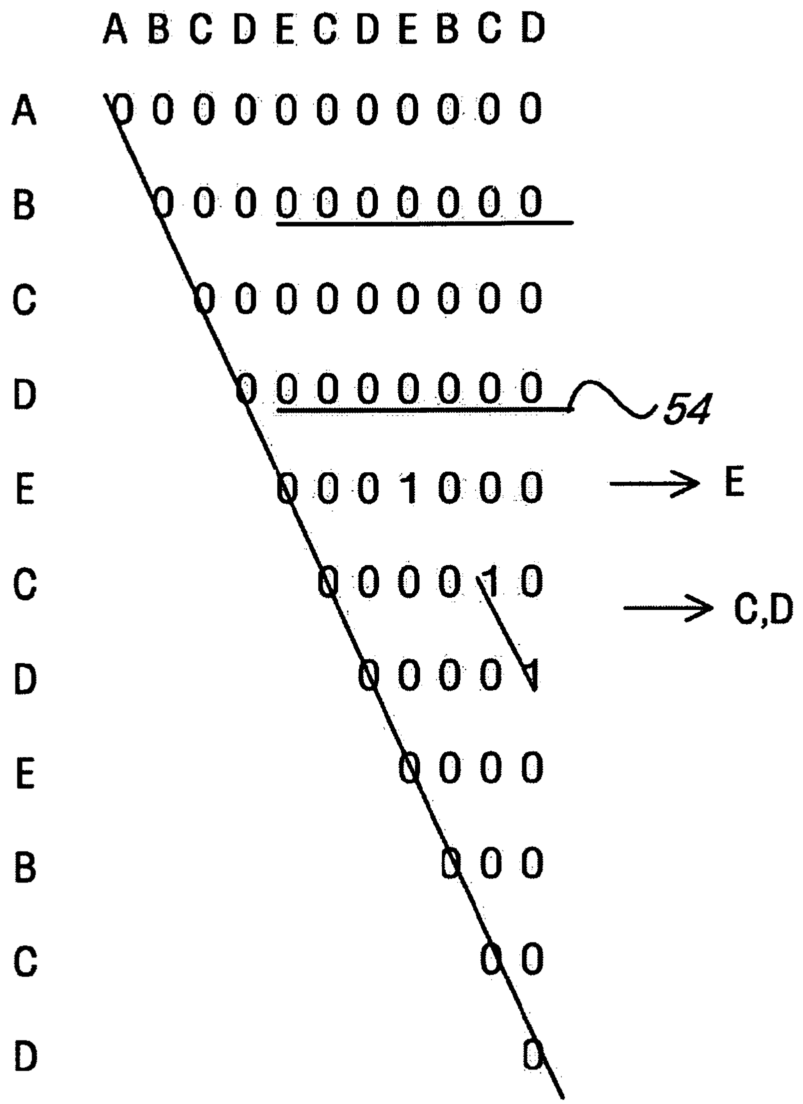

Referring to FIG. 5C, then, a boundary line 54 is drawn for the row in which a paragraph has been extracted and the value ('1') for the row contained within the boundary line 54, in which a paragraph has been extracted, is changed to '0'. Then, the first paragraph extractor 141 extracts a paragraph for character string E located in the row through character string D located in the last row.

FIG. 5D illustrates paragraphs extracted by the first paragraph extractor 141 and represented as a table. Referring to FIG. 5D, a character string having the number of repetition greater than 1 is classified as a paragraph.

For example, a character string containing 'goodlady' that is repeated 11 times is classified as a paragraph P0. Character strings containing 'You with so small and white hands/makes me crazy' that are repeated six times are classified as a paragraph P1.

Further, an example of extracting a thematic portion of an audio file will be described with reference to FIG. 5D.

For example, when a user desires to retrieve an audio file, the controller 160 extracts a thematic portion of the audio file from a tree structure of the audio file. The thematic portion of the audio file refers to the most memorable and impressive portion of the song to a user, a portion of the song containing a theme that a composer desires to emphasize, or the most emotional portion of a song that can be sung by an artist.

Then, the extracted thematic portion of the audio file is output to the user so that he/she can recognize the audio file more quickly, thus reducing the amount of time required to select the audio file.

In order to extract a thematic portion of an audio file, the following 5 features may be extracted for each paragraph.

A first feature is the number of repetition of a predetermined paragraph subtracted from the number of most frequently repeated paragraphs among paragraphs extracted by the paragraph extractor 140.

Referring to FIG. 5D, for example, when the number of the most frequently repeated character strings is 11 and the ID of the predetermined paragraph is 0, the first feature has a value of 0 (=11−11). When the ID of the predetermined paragraph is 1, the first feature has a value of 5 (=11−6). When the ID of the predetermined paragraph is 2, the first feature has a value of 6 (=11−5).

A second feature is the ratio of the length of repeated character string to the length of all character strings contained in lyric information.

Referring to FIG. 5D, the length of all character strings is 48 and the lengths of character strings in paragraphs P0 and P1 are 1 and 2, respectively. Thus, the ratio of the length of character string in P0 to the length of all character strings is 1/48 and the ratio of length of character strings in P1 thereto is 2/48.

A third feature is the total length of character strings in a specific paragraph of the entire lyric information.

For example, when the length of a character string in P0 is 1 and the length of character strings in P1 is 2, the total lengths of all character strings in P0 and P1 are 11 and 12 because P0 and P1 are repeated 11 times and 6 times.

A fourth feature is the type of all verses in which a specific paragraph occurs.

For example, the paragraph P0 occurs in the first through third verses.

A fifth feature is information about whether a paragraph will begin before or after an interlude.

By comprehensively considering the above five features, a paragraph is extracted as a thematic portion of an audio file, the paragraph being frequently repeated, having long character strings and a high proportion relative to the overall lyric, repeatedly occurring in many verses, and occurring before/after an interlude.

One way to compare the features of paragraphs with one another is to use simple comparison rules. Another way is to automatically create comparison rules using a pattern recognition technique by comparing a given paragraph with a thematic portion predetermined by a music expert.

FIG. 6 illustrates an example of extracting an extended paragraph in the second paragraph extractor (142 of FIG. 1) of the apparatus for extracting the structure of song lyrics using a repeated pattern thereof according to a modified embodiment of the present invention.

Referring to FIG. 6, the second paragraph extractor 142 sequentially combines IDs of the paragraphs to check the number of repetitions of combined paragraphs. In this case, the number n of IDs combined is between 2 (n=2) and 8 (n=8). The following tables show an example in which the number of IDs combined is 2 through 4.

n = 2

| Paragraph ID | Number of repetitions |
|---|---|
| 0, 1 | 6 |
| 1, 0 | 5 |
| 0, 2 | 5 |

n = 3

| Paragraph ID | Number of repetitions |
|---|---|
| 0, 1, 0 | 5 |
| 1, 0, 2 | 5 |
| 0, 2, 0 | 3 |
| 2, 0, 1 | 3 |

n = 4

| Paragraph ID | Number of repetitions |
|---|---|
| 0, 1, 0, 2 | 5 |
| 1, 0, 2, 0 | 3 |
| 0, 2, 0, 1 | 3 |

Thus, the number of repetition of paragraphs 0, 1 (n=2) is compared with the number of repetition of paragraphs 0,1,0 (n=3). Because the number of repetitions of paragraphs 0, 1 (n=2) is not equal to that for paragraphs 0,1,0 (n=3), the paragraph 0,1 and paragraph 0,1,0 are joined into an EP. Thereafter, the number of repetitions of the paragraphs 0,1,0 (n=3) is compared with the number of repetitions of paragraph 0,1,0,2 (n=4).

Then, the number of repetitions of paragraphs 1,0 (n=2) is compared with the number of repetitions of paragraphs 1,0,2 (n=3). Because the number of repetitions of paragraphs 1,0 (n=2) is equal to that for paragraphs 1,0,2 (n=3), the paragraphs 1,0 (n=2) are not an EP while the paragraphs 1,0,2 (n=3) become an EP. Thereafter, the number of repetitions of the paragraphs 1,0,2 (n=3) is compared with the number of repetitions of paragraphs 0,1,0,2 (n=4).

Next, the number of repetitions of paragraphs 0,2 (n=2) is compared with the number of repetitions of paragraphs 0,2,0 (n=3). Because the former is equal to the latter, the paragraphs 0,2 (n=2) are not an EP while the paragraphs 0,2,0 (n=3) become an EP. Thereafter, the number of repetitions of the paragraphs 0,2,0 (n=3) is compared with the number of repetitions of paragraphs 1,0,2,0 (n=4).

Then, as a result of subsequent comparison, because the number of repetitions of paragraphs 0,1,0 (n=3) is equal to the number of repetitions of paragraphs 0,1,0,2 (n=4), the paragraphs 0,1,0 (n=3) are not an EP while the paragraphs 0,1,0,2 (n=4) become an EP.

Then, the numbers of repetitions of paragraphs 1,0,2, 0,2,0, and 2,0,1 (n=3) are compared with those for paragraphs 0,1, 0,2, 1,0,2,0, and 0,2,0,1 (n=4), respectively. As a result of this comparison, the paragraphs 1,0,2, 0,2,0, and 2,0,1 (n=3) are not an EP.

Thus, as a result of extracting an EP for paragraphs (n is 2 through 8), the paragraphs 0,1, 0,1,0,2, 0,1,0,2,0,1, and 0,1, 0,2,0,1,0,2 become EPs.

Figure 7:
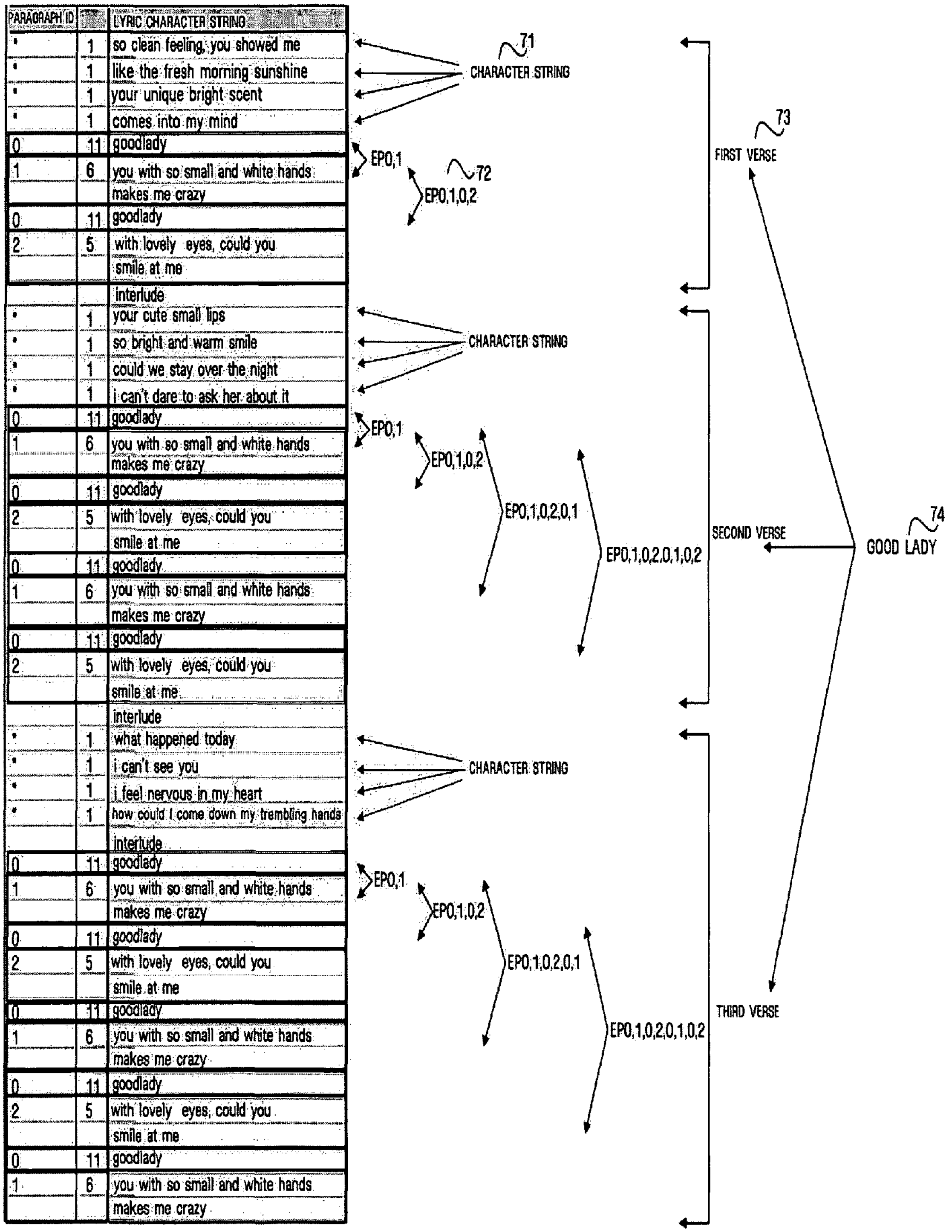
FIG. 7 illustrates an example of arranging predetermined lyric information in a tree structure in an apparatus for extracting the structure of song lyrics using a repeated pattern thereof according to a modified exemplary embodiment of the present invention.

FIG. 7 illustrates an example of arranging predetermined lyric information in a tree structure in an apparatus for extracting the structure of song lyrics using a repeated pattern thereof according to a modified exemplary embodiment of the present invention.

Referring to FIG. 7, the lyric structure generator (150 of FIG. 1) arranges various types of information about song lyrics in a three structure. The information includes character string information 71 obtained by the character string information extractor 130, EPs 72 and information 73 about lyric verses (1 through 3) extracted by the paragraph extractor 140, and title information 74 extracted by the preprocessor 120.

Thus, upon a user's request for the playback of an audio file, the present invention can immediately provide information about a section desired by the user based on analyzed information arranged in the tree structure. The present invention also allows a section of the audio file to be played during the time designated by the user upon the user's request for a summary version of the audio file.

Figure 8:
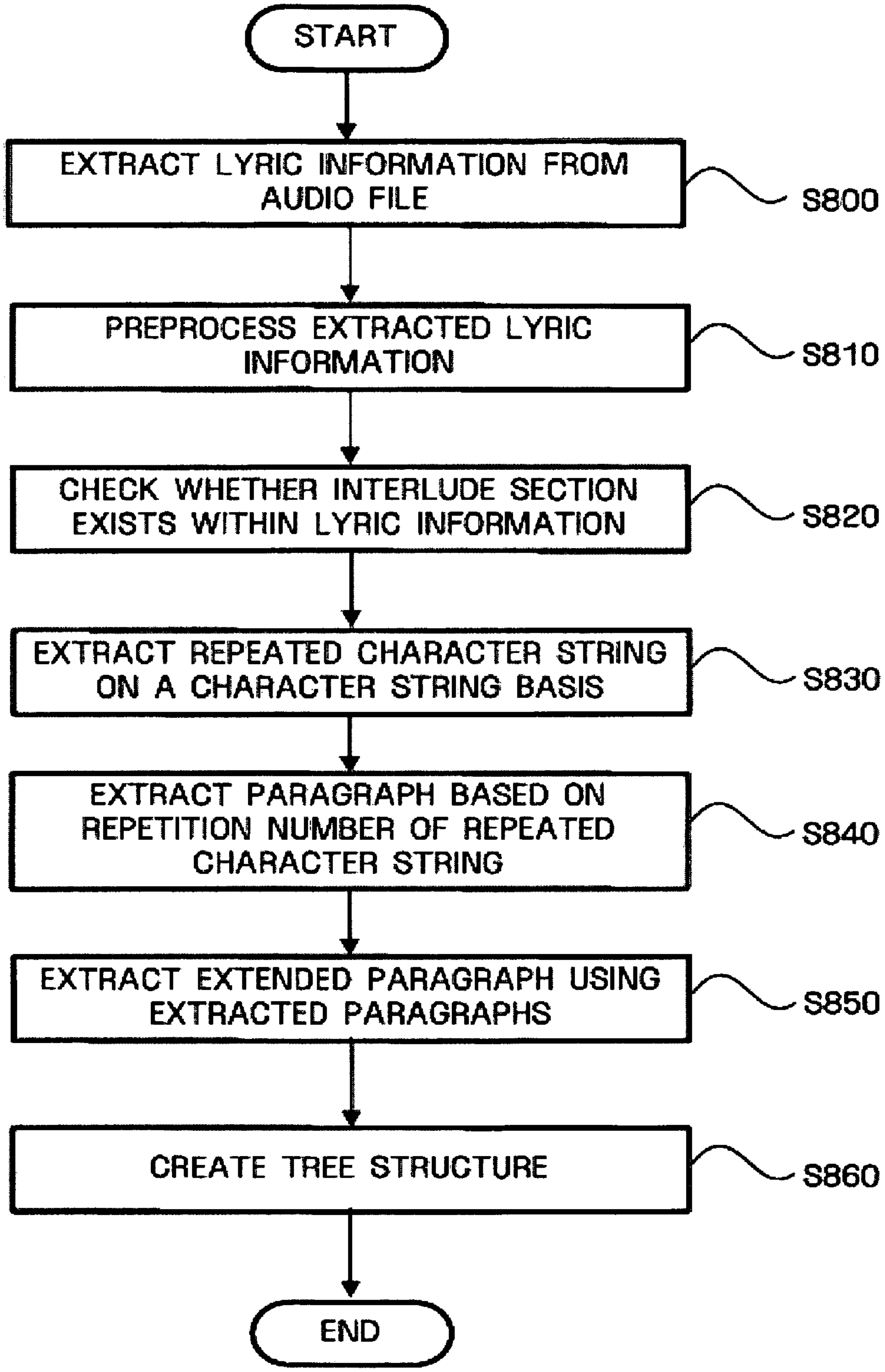
FIG. 8 is a flowchart illustrating a method for extracting the structure of song lyrics using a repeated pattern thereof according to an exemplary embodiment of the present invention.

FIG. 8 is a flowchart illustrating a method for extracting the structure of song lyrics using a repeated pattern thereof according to an exemplary embodiment of the present invention. The method for extracting the structure of song lyrics will now be described in more detail with reference to FIGS. 1 and 8.

Referring to FIG. 8, in S800, the lyric extractor 110 extracts title information and lyric information from metadata for an audio file stored in ID3 tag v2 and watermark.

In step S810, the preprocessor 120 preprocesses the received lyric information. More specifically, the preprocessor 120 deletes information other than the lyric information, including special characters (e.g., -, _, ( ), < >, and . . . ), punctuation marks (e.g., ' and "), blank spaces (e.g., spaces between words), and a rap portion and converts upper-case characters into lower-case characters.

In steps S820 and S830, the character string information extractor 130 extracts an interlude section and a repeated character string based on the lyric information preprocessed by the preprocessor 120.

For example, the character string information extractor 130 extracts the same word as a keyword for an interlude section (e.g., interlude being played) from a character string in the lyric information and calculates a distance between two character strings to extract a repeated character string. The distance between two character strings is obtained by comparing the degree of sameness between the two character strings or the degree of repetition of the same characters (i.e., similarity) within the character strings. When the degree of sameness or similarity is greater than a threshold (e.g., 70%), the two character strings can be determined to be the same. Because these have been described in detail earlier with reference to FIGS. 3 and 4, a detailed explanation thereof will not be given.

In step S840, the first paragraph extractor 141 extracts a paragraph using a repeated character string extracted by the character string information extractor 130. The first paragraph extractor 141 may extract a paragraph using a dynamic programming search algorithm.

For example, when the numbers of repetition of character strings A, B, C, D, and E are 1, 2, 3, 3, and 2, respectively, the first paragraph extractor 140 extracts character strings C and D as a paragraph. Since this has been described above with reference to FIG. 5, a detailed explanation thereof will not be given.

In step S850, the second paragraph extractor 142 extracts a set of paragraphs having the same repeated pattern ('EP') among paragraphs extracted by the first paragraph extractor 141. An EP is a set of two or more consecutive paragraphs. Since this has been described above with reference to FIG. 6, a detailed description thereof will not be given.

In step S860, the lyric structure generator 150 arranges verses obtained by splitting the song lyrics (e.g. first through third verses), title information, character string information, and EPs in a tree structure.

For example, when a user desires to retrieve an audio file, the controller 160 extracts a thematic portion of the audio file from a tree structure of the audio file and outputs the same to a user so that he/she can recognize the audio file more quickly, thus reducing the amount of time required to select the audio file.

The controller 160 may also output a portion of an audio file (e.g., EP) to be played during the time (e.g., 20 sec) that can be designated upon a user's request for a summary version of the audio file.

Figure 9:
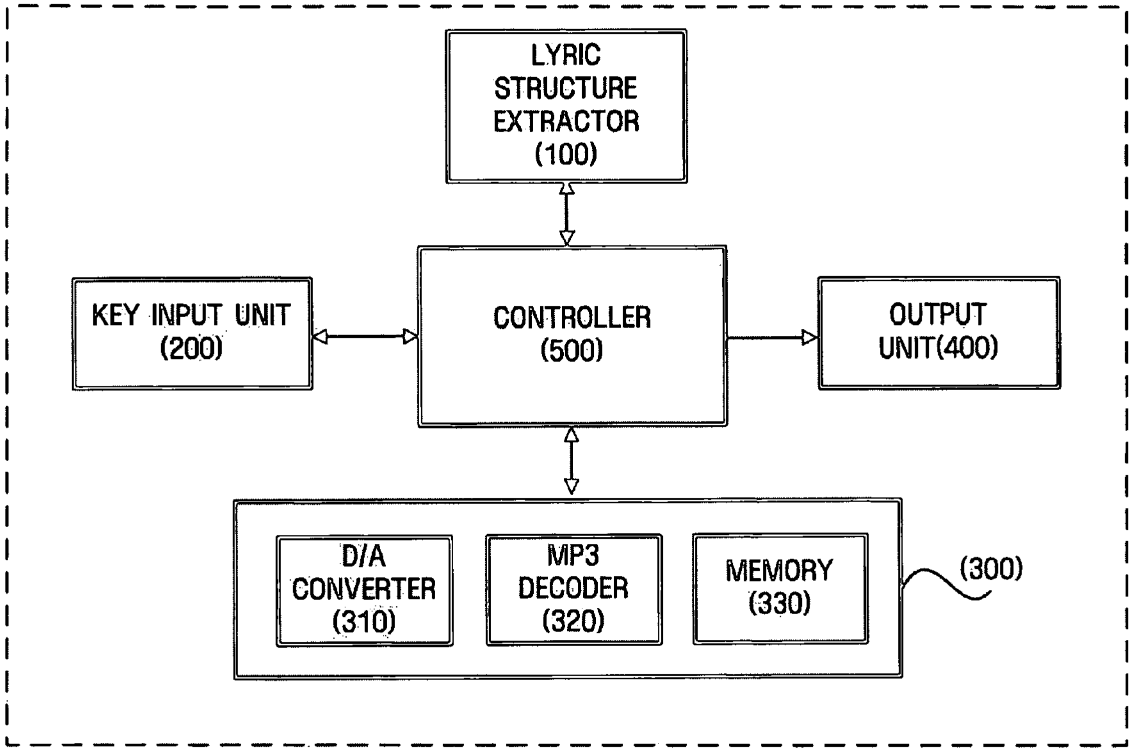
FIG. 9 is an internal block diagram of a system for extracting the structure of song lyrics using a repeated pattern thereof according to an exemplary embodiment of the present invention.

FIG. 9 is an internal block diagram of a system for extracting the structure of song lyrics using a repeated pattern thereof according to an embodiment of the present invention. In the present invention, an apparatus for extracting the structure of song lyrics using a repeated pattern thereof is an MP3 mobile phone using a technique for extracting the structure of song lyrics using a repeated pattern thereof.

Referring to FIG. 9, the system includes a key input unit 200, a lyric structure extractor 100, an audio file management unit 300, an output unit 400, and a controller 500.

The key input unit 200 receives predetermined key signals generated by a user's selection. The key signals can be understood as various function key signals for making a phone call, numeric key signals, or operation key signals (such as record, play, and stop keys) for playing an audio file (e.g., MP3 file).

The lyric structure extractor 100 analyzes song lyrics related to an audio file, extracts a repeated character string and then a paragraph and an EP based on the repeated character string, and arranges information about the song lyrics in a tree structure. Because the lyric structure extractor 100 has the same functions and structure as the apparatus of FIG. 1 for extracting the structure of song lyrics using a repeated pattern thereof, a detailed description thereof will not be given.

The audio file management unit 300 manages the storage and playback of the audio file. In this case, the audio file is an MP3 file. The audio file management unit 300 includes a digital-to-audio (D/A) converter 310, a decoder 320, and a memory 330.

The decoder 320 reconstructs audio data compressed in the MP3 format into data in the pulse code modulation (PCM) format using STA 013 available from ST Microelectronics.

The D/A converter 310 converts audio data in the PCM format output by the decoder 320 into an analog audio signal. The output unit 400 outputs left "L" and right "R" audio signals that are left- and right-channel audio signals.

The memory 330 stores digital audio data converted into the MP3 format and supplementary information associated with the digital audio data. The output unit 400 outputs audio signals received from the audio file management unit 300 or other elements. The controller 500 controls the operation of all other components (100 through 400) contained in the system for extracting the structure of song lyrics using a repeated pattern thereof.

The apparatus, system, and method for extracting the structure of song lyrics using a repeated pattern thereof according to the present invention have one or more of the following advantages.

The present invention can more quickly provide a section of an audio file appropriate for a user's request by arranging information about song lyrics in a tree structure, which is obtained by extracting a repeated character string and a paragraph through analysis of the song lyrics.

The present invention can also reduce the amount of time required for a user to select an audio file by providing a thematic portion of song lyrics upon a user's request for retrieval of an audio file based on the extracted lyric structure.

The present invention also can reduce the amount of time and computations required for extracting a thematic portion by extracting a character string and a paragraph based on the song lyrics, compared to a method for analyzing the waveform of a music signal.

While the present invention has been particularly shown and described with reference to exemplary embodiments thereof, it will be apparent to those skilled in the art that the scope of the invention is given by the appended claims, rather than the preceding description, and all variations and equivalents which fall within the range of the claims are intended to be embraced therein. Therefore, it should be understood that the above embodiments are not limitative, but illustrative in all aspects.

What is claimed is:

1. An apparatus for extracting the structure of song lyrics using a repeated pattern of the song lyrics, comprising:

a memory for storing an audio file;

a lyric extractor for extracting lyric information from metadata contained in the audio file;

a character string information extractor for extracting an interlude section and a repeated character string based on the extracted lyric information;

a paragraph extractor for extracting a paragraph based on the repeated character string and then a set of paragraphs having a same repeated pattern among the extracted paragraphs;

a lyric structure generator module for arranging interlude sections, character strings, and paragraphs related to the audio file in a tree structure; and a controller which extracts a portion of the audio file based on the tree structure and outputs the extracted portion on an audio playing device.

2. The apparatus of claim 1, wherein the character string information extractor comprises:

an interlude section extractor for extracting a keyword for an interlude section from a character string contained in the extracted lyric information; and a character string repetition number extractor for calculating a distance between two character strings in the extracted lyric information and extracting the number of repetitions of character strings.

3. The apparatus of claim 2, wherein the distance between two character strings is calculated using $sim(S_I,S_J)=A_{I,J}/max(I,J)$ when $A_{I,J}$ is the number of the same characters within each character string and max(I,J) is a greater number of characters within the character strings $S_I$ and $S_J$.

4. The apparatus of claim 3, wherein a degree of similarity between characters in the two character strings is calculated using $a(i,j)=max(a(i,j-1),a(i-1,j),a(i-1,j-1)+\delta(s_i,s_j))$ when i and j denote characters within the two character strings and $\delta(s_i,s_j)$ indicates the sameness between characters being compared.

5. The apparatus of claim 1, wherein the paragraph extractor comprises:

a first paragraph extractor for extracting a set of consecutive character strings having the same number of repetitions among the repeated character strings as a paragraph; and a second paragraph extractor for extracting a set of paragraphs having the same repeated pattern among the paragraphs extracted by the first paragraph extractor.

6. The apparatus of claim 1, further comprising:

a preprocessor for deleting supplementary information contained in the extracted lyric information.

7. The apparatus of claim 1, wherein the tree structure comprises:

a hierarchy, wherein levels within the hierarchy comprise:
- title information, wherein the title information comprises:
  - lyric verses information, wherein the lyric verses information comprises:
    - extended paragraph information, and
    - character string information.

8. The apparatus of claim 1, wherein the portion of the audio file output by the controller includes information about the extracted paragraph, wherein the information about the extracted paragraph is based on at least one of:

a number of repetitions of the extracted paragraph;

a ratio of a length of the repeated character string in the extracted paragraph to a length of all character strings in the lyric information;

a total length of character strings in the extracted paragraph, wherein the total length is based on a length of the character strings in the extracted paragraph and the number of repetitions of the extracted paragraph;

a type of all verses in which the extracted paragraph occurs; and whether the extracted paragraph is before or after the interlude.

9. A method for extracting the structure of song lyrics using a repeated pattern of the song lyrics, the method comprising:

extracting lyric information from metadata contained in an audio file stored in a memory;

extracting an interlude section and a repeated character string based on the extracted lyric information by a character string information extractor;

extracting a paragraph based on the repeated character string by a paragraph extractor;

extracting a set of paragraphs having the same repeated pattern among the extracted paragraph by the paragraph extractors;

arranging interlude sections, character strings, and paragraphs related to the audio file in a tree structure;

extracting a portion of the audio file based on the tree structure; and outputting the extracted portion of the audio file on an audio playing device.

10. The method of claim 9, wherein a distance between two character strings is calculated by a character string repetition number extractor using $sim(S_I,S_J)=A_{I,J}/max(I,J)$ when $A_{I,J}$ is the number of the same characters within each character string and max(I,J) is a greater number of characters within the character strings $S_I$ and $S_J$.

11. The method of claim 10, wherein a degree of similarity between characters in the two character strings is calculated by the character string repetition number extractor using $a(i,j)=max(a(i,j-1),a(i-1,j),a(i-1,j-1)+\delta(s_i,s_j))$ when i and j denote characters within the two character strings and $\delta(s_i,s_j)$ indicates the sameness between characters being compared.

12. The method of claim 9, further comprising performing preprocessing by the preprocessor to delete supplementary information contained in the extracted lyric information.

13. The method of claim 9, wherein the extracted portion of the audio file includes information about the extracted paragraph, wherein the information about the extracted paragraph is based on at least one of:

a number of repetitions of the extracted paragraph;

a ratio of a length of the repeated character string in the extracted paragraph to a length of all character strings in the lyric information;

a total length of character strings in the extracted paragraph, wherein the total length is based on a length of the character strings in the extracted paragraph and the number of repetitions of the extracted paragraph;

a type of all verses in which the extracted paragraph occurs; and whether the extracted paragraph is before or after the interlude.

14. The method of claim 9, wherein the tree structure comprises:

a hierarchy, wherein levels within the hierarchy comprise:

title information, wherein the title information comprises:

lyric verses information, wherein the lyric verses information comprises:

extended paragraph information, and character string information.

15. A system for extracting the structure of song lyrics using a repeated pattern of the song lyrics, the system comprising:

a memory for storing an audio file;

a key input unit for receiving predetermined key input signals generated by a user's selection;

an audio file management unit for managing an operation related to the audio file when the key input signals indicate a request for the audio file;

a lyric structure generator for analyzing the song lyrics extracted from metadata contained in the audio file, extracting a repeated character string and a paragraph, and arranging information about the song lyrics in a tree structure; and a controller which extracts a portion of the audio file based on the tree structure and outputs the extracted portion of the audio file on an audio playing device.

16. The system of claim 15, wherein the portion of the audio file output by the controller includes information about the extracted paragraph, wherein the information about the extracted paragraph is based on at least one of:

a number of repetitions of the extracted paragraph;

a ratio of a length of the repeated character string in the extracted paragraph to a length of all character strings in the lyric information;

a total length of character strings in the extracted paragraph, wherein the total length is based on a length of the character strings in the extracted paragraph and the number of repetitions of the extracted paragraph;

a type of all verses in which the extracted paragraph occurs; and whether the extracted paragraph is before or after the interlude.

* * * * *